United States Patent [19]

Mueller et al.

[11] Patent Number: 5,779,744
[45] Date of Patent: Jul. 14, 1998

[54] AIR AND LIQUID SEPARATOR FOR A CARPET EXTRACTOR

[75] Inventors: David G. Mueller, North Canton; Erik D. Lesco, Hartville, both of Ohio

[73] Assignee: The Hoover Company, North Canton, Ohio

[21] Appl. No.: 853,595

[22] Filed: May 9, 1997

[51] Int. Cl.⁶ .................... B01D 45/04; B01D 47/02
[52] U.S. Cl. .................... 55/246; 15/350; 15/353; 55/248; 55/410; 55/418; 55/423; 55/439; 55/462; 55/466; 55/DIG. 3
[58] Field of Search ............ 55/DIG. 3, 248, 55/246, 449, 447, 418, 419, 437, 439, 462, 465, 471, 472, 466, 423, 410; 15/350, 353, 347

[56] References Cited

U.S. PATENT DOCUMENTS

| | | | |
|---|---|---|---|
| 386,173 | 7/1888 | White | 55/216 |
| 514,677 | 2/1894 | Furnas | 15/353 |
| 2,001,121 | 5/1935 | Breuer | 55/447 |
| 2,292,435 | 8/1942 | Crites | 15/321 |
| 2,461,677 | 2/1949 | Burdock et al. | 15/353 |
| 2,539,195 | 1/1951 | Lang | 15/335 |
| 2,649,927 | 8/1953 | Oretega | 55/368 |
| 2,784,717 | 3/1957 | Thompson | 55/348 |
| 3,056,994 | 10/1962 | Noble | 15/321 |
| 3,177,635 | 4/1965 | Cawl et al. | 55/274 |
| 3,267,511 | 8/1966 | Meyerhoefer | 15/353 |
| 3,267,650 | 8/1966 | Lundin | 55/433 |
| 3,316,579 | 5/1967 | Smith | 15/320 |
| 3,877,902 | 4/1975 | Eriksson et al. | 55/DIG. 3 |
| 3,896,521 | 7/1975 | Parise | 15/321 |
| 4,088,462 | 5/1978 | Laule et al. | 55/437 |
| 4,216,563 | 8/1980 | Cyphert | 15/132 |
| 4,287,635 | 9/1981 | Jacobs | 15/321 |
| 4,314,385 | 2/1982 | Wimsatt et al. | 15/321 |
| 4,317,662 | 3/1982 | Hudson, Jr. | 55/447 |
| 4,341,540 | 7/1982 | Howerin | 55/DIG. 3 |
| 4,358,300 | 11/1982 | Schlapman et al. | 55/248 |
| 4,382,808 | 5/1983 | Van Wormer, Jr. et al. | 55/418 |
| 4,464,810 | 8/1984 | Karpanty | 15/320 |
| 4,558,484 | 12/1985 | Groth | 15/320 |
| 4,571,772 | 2/1986 | Dyson | 15/335 |
| 4,586,208 | 5/1986 | Trevarthen | 8/158 |
| 4,673,422 | 6/1987 | Tidwell | 55/248 |
| 4,724,573 | 2/1988 | Ostergaard | 15/321 |
| 4,809,397 | 3/1989 | Jacobs et al. | 15/320 |
| 4,864,680 | 9/1989 | Blase et al. | 15/321 |
| 4,910,828 | 3/1990 | Blase et al. | 15/321 |
| 5,012,549 | 5/1991 | Williams et al. | 15/320 |
| 5,287,591 | 2/1994 | Rench et al. | 55/DIG. 3 |
| 5,301,386 | 4/1994 | Thomas et al. | 15/321 |
| 5,319,828 | 6/1994 | Waldhauser et al. | 15/320 |
| 5,354,347 | 10/1994 | Mccoy et al. | 55/248 |
| 5,386,613 | 2/1995 | Woo | 15/326 |
| 5,493,753 | 2/1996 | Rostamo | 55/DIG. 3 |
| 5,525,396 | 6/1996 | Rudolph et al. | 55/DIG. 3 |

FOREIGN PATENT DOCUMENTS

| | | |
|---|---|---|
| 1264362 | 5/1961 | France. |
| WO 91/12761 | 9/1991 | WIPO. |

*Primary Examiner*—Duane S. Smith
*Attorney, Agent, or Firm*—A. Burgess Lowe; Bruce P. Watson

[57] ABSTRACT

An air/liquid separator is provided in a hollow, preferably transparent, removable lid on a recovery tank of a wet pickup suction cleaner. The lid has a wall therein dividing the lid into an inlet/separating chamber and an exit chamber. Liquid and dirt entrained working air enters the inlet chamber and flows horizontally across the inlet chamber over a plurality of discharge openings passing through the lid bottom plate, such that the stream of dirty liquid and air is redirected downward through the discharge openings into the recovery tank. The plurality of discharge openings in the lid bottom plate are arranged generally progressively along the stream of liquid and air entering and flowing across the inlet chamber. The discharge openings preferably increase in size moving downstream in the inlet chamber, i.e. away from the entry into the inlet chamber. The exit chamber fluidly communicates with the interior of the recovery tank through an exit opening passing through the lid bottom plate. A vacuum is preferably drawn upon the exit chamber by an electric fan for providing the required working air flow through the combined air/liquid separator.

45 Claims, 4 Drawing Sheets

AIR AND LIQUID SEPARATOR FOR A CARPET EXTRACTOR

BACKGROUND OF THE INVENTION

1. Field of the Invention

The present invention pertains to an air and liquid separator particularly useful in an extraction type carpet cleaner.

2. Summary of the Prior Art

Carpet extractors generally spray, or otherwise deposit, a cleaning liquid, such as water or a suitable cleaning solution, upon the carpet or other surface to be cleaned followed by removal of the deposited liquid, along with dirt entrained in the liquid, by a suction nozzle. An air/liquid separator device is thus required to separate the liquid and entrained dirt from the working air. Tortuous air flow paths, sudden fluid expansion, or combinations of both are typically used to reclaim the liquid and entrained dirt from the working air.

SUMMARY OF THE INVENTION

An object of the present invention is to provide an improved air and water separator for use with wet pickup floor care appliances. More particularly, it is an object of the present invention to provide a separator for an upright carpet extractor having enhanced air and water separation without adversely affecting the air flow through the separator.

The foregoing and other object of the present invention, that will be readily apparent from the following description and the attached drawings, are achieved in one preferred embodiment of the present invention by providing an air/liquid separator for use on a wet pickup suction cleaner and more specifically for use on an extractor having an upright configuration as illustrated in FIG. 1. In an upright extractor it is preferred that the recovery tank and air/liquid separator be combined into one removable assembly for ease of emptying the recovered cleaning solution. It is further desirable that the separator incorporate means whereby the operator may visually observe the flow of extracted liquid recovered by the extractor.

In one form or preferred embodiment of the present invention, the recovery tank is provided with a hollow, preferably transparent, removable lid having a wall therein dividing the lid into two separate chambers, an inlet/separating chamber and an exit chamber. Liquid and dirt entrained working air preferably vertically enters an inlet opening to the inlet chamber, immediately negotiates a ninety degree turn to the horizontal, and flows horizontally across the inlet chamber over a plurality of discharge openings in the lid bottom plate, such that the stream of dirty liquid and air is redirected downward through the discharge openings into the recovery tank. The incoming liquid and dirt entrained working air thus experiences a tortuous turn, and an expansion immediately upon entering the inlet chamber, followed by a second tortuous turn downward through the lid discharge openings and further expansion and deceleration upon entering the recovery tank where final separation of the liquid and entrained dirt from the working air occurs.

The plurality of discharge openings in the lid bottom plate are preferably arranged generally progressively along the stream of liquid and air entering and flowing across the inlet chamber. The discharge openings preferably increase in size moving downstream in the inlet chamber, i.e. away from the entry into the inlet chamber.

The exit chamber also fluidly communicates with the interior of the recovery tank through an exit opening passing through the lid bottom plate. A vacuum is preferably drawn upon the exit chamber by the extractor suction fan, thereby providing the required working air flow into and out of the combined air/liquid separator and recovery tank.

BRIEF DESCRIPTION OF THE DRAWINGS

The invention will now be described, by way of example, with reference to the accompanying drawing, of which.

DETAILED DESCRIPTION OF THE INVENTION

Figure 1:
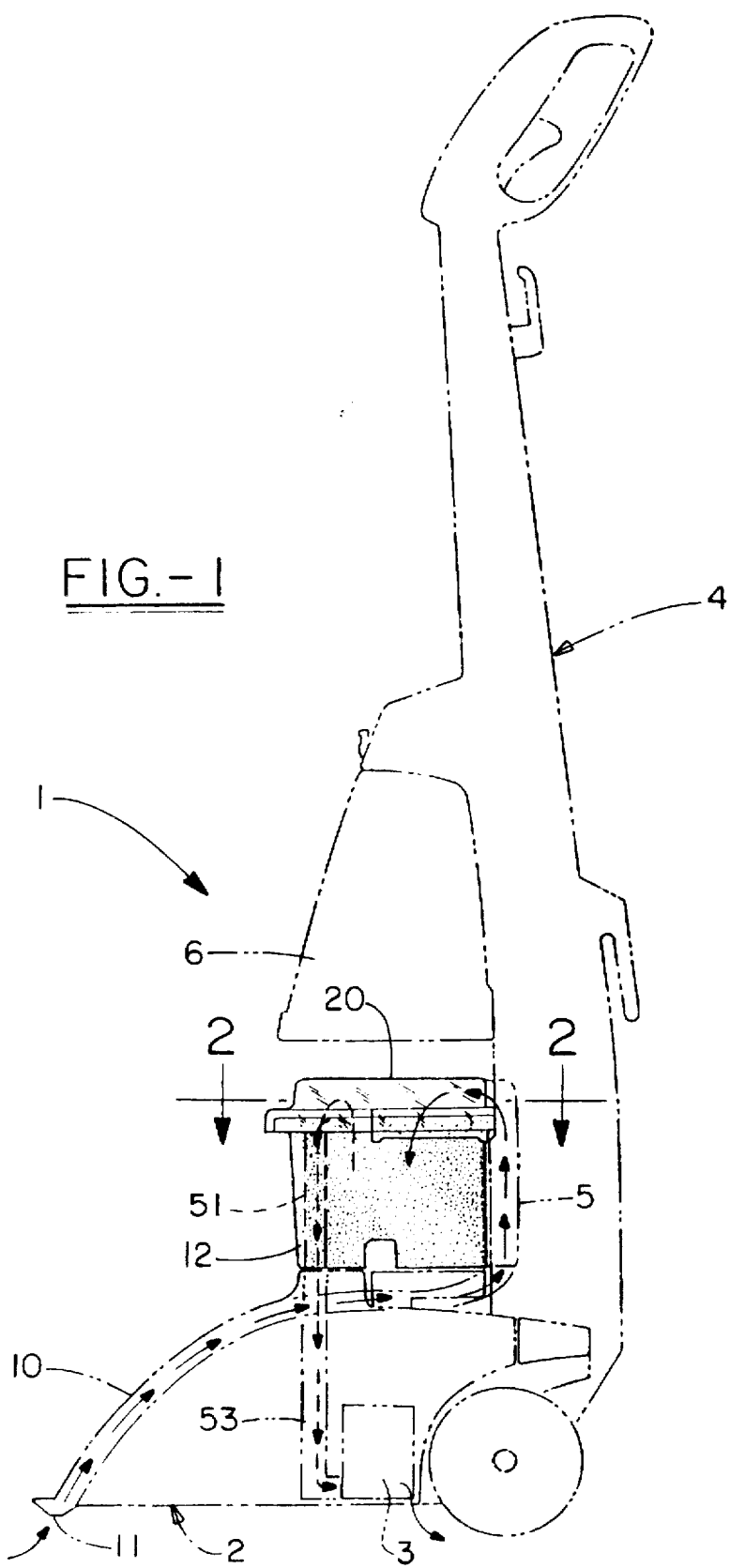
FIG. 1 is a pictorial side view of an upright carpet extractor having a recovery tank including a lid incorporating an air and liquid separator according to the present invention.

In one form or preferred embodiment of the present invention, the air and liquid separator is formed by a hollow lid 20 that is removably mounted on the top of an open top recovery tank 12 configured to removably set atop a base frame 2 of an upright carpet extractor 1, as illustrated in FIG. 1. The base frame 2 includes two laterally displaced wheels suitably attached to the rear of the frame and a suction motor/fan assembly 3 (diagrammatically illustrated in ghost in FIG. 1). Pivotally attached to the base frame assembly 2 is a handle assembly 4. Removably supported upon the handle assembly 4 is a cleaning solution supply tank 6. Attached to a top portion of the base frame assembly 2 is a hood assembly 10 incorporating therein a floor nozzle 11.

Upright extractor 1 is used for illustrative purposes only. It will be appreciated that an air and liquid separator according to the present invention may be used with other types of extractors, for example, canister type extractors, with wet/dry utility vacuum cleaners or with any other type of wet pickup suction cleaner. As such, FIG. 1 and the accompanying description are not intended to limit the air and liquid separator according to the present invention to use in combination with an upright extractor as illustrated and described. The structure and operation of the upright extractor 1 do not form a part of the present invention and are therefore not described in detail herein. A detailed description of the structure and operation of the upright extractor illustrated in FIG. 1 can be found in co-owned U.S. Pat. No. 5,500,977, issued on Mar. 26, 1996, the description of which is hereby incorporated herein as of reference.

Figure 2:
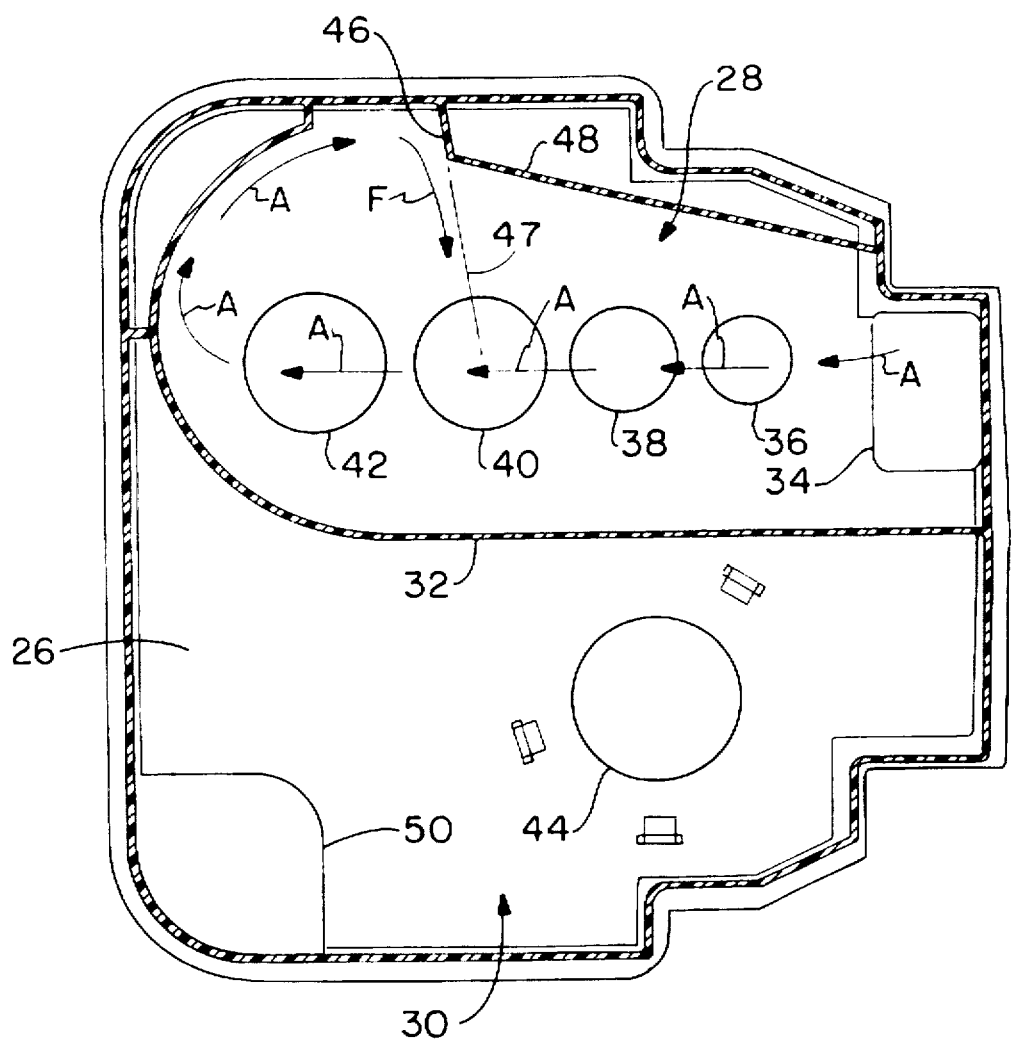
FIG. 2 is a cross-section of the air and liquid separator according to the present invention taken along line 2—2 in FIG. 1.

Referring now to FIG. 2, the top of the recovery tank 12 (shown in FIG. 1 only) is selectively sealed by the combined separator and recovery tank lid 20. The lid 20 comprises a top plate 24 and a bottom plate 26 (see FIG. 4) sealingly welded or otherwise adhered together forming a plenum therebetween. The plenum is divided by a dividing wall 32 into two separate and distinct chambers, an inlet or separating chamber 28 and an exit chamber 30. The dividing wall 32 is preferably integrally molded into the lid and extends between the lid top plate 24 and the lid bottom plate 26. The separating chamber 28 fluidly communicates through an inlet opening 34 in the bottom plate 26 with a suction duct 5 (diagrammatically illustrated in ghost in FIG. 1) that communicates with the floor nozzle. Any suitable sealing means, such as a gasket, may be used between the suction duct 5 and the inlet opening 34. The gasket and all gaskets identified herein are preferably made from closed cell extruded cellular rubber. The suction duct may be integrally molded into the recovery tank 12 or it may extend up from the base frame assembly 2.

A plurality of inlet chamber discharge openings 36, 38, 40 and 42 extend through the lid bottom plate 26 and provide fluid communication between the tank 12 and the inlet chamber 28. Similarly, the exit chamber 30 includes an exit opening 44 passing through the bottom plate 26 providing fluid communication between the tank 12 and the exit chamber 30. It is preferable to provide a conventional shut-off float within a conventional float cage (not shown) to choke off the flow of working air through the exit opening 44 when the reclaimed fluid within recovery tank 12 reaches a desired level.

Figure 5:
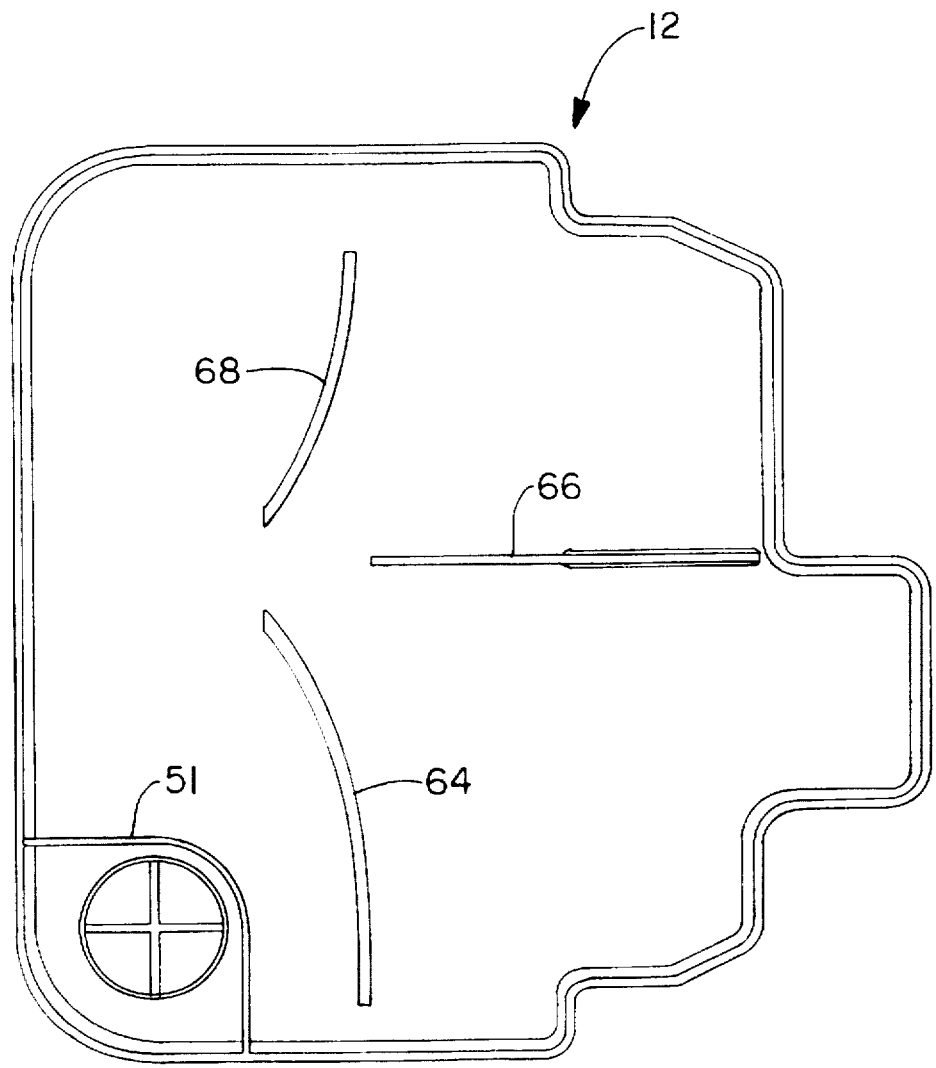
FIG. 5 is a top plan view of the recovery tank with the lid containing the separator removed therefrom.

The exit chamber 30 further includes an exhaust or outlet opening 50. An exhaust duct 51, that either is integrally molded into the tank 12 (as shown in FIG. 5) or extends up from the base frame assembly 2, communicates the outlet opening 50 with the motor fan assembly via an outlet duct 53 (diagrammatically illustrated in ghost in FIG. 1) located in the base frame assembly, when the recovery tank assembly is mounted to the extractor and the lid 20 is mounted to the tank 12. The lid assembly is removably mounted to the tank 12 by any suitable releasable latching means (not shown). Any suitable sealing means such as a gasket may be used to seal the lid upon the top of the recovery tank.

In operation, as diagrammatically illustrated by dashed arrows in FIG. 1, the inlet of the suction motor fan assembly 3 fluidly communicates with the recovery tank 12 via the outlet duct 53, the exhaust duct 51 and the exit chamber 30 (see FIG. 2), thereby creating a partial vacuum within the recovery tank. As diagrammatically illustrated by solid arrows in FIG. 1, the vacuum in the recovery tank causes working air, including entrained liquid and dirt, to be drawn in through the floor nozzle 11, the suction duct 5, the separating chamber 28 (see FIG. 2) and into the recovery tank 12.

Figure 4:
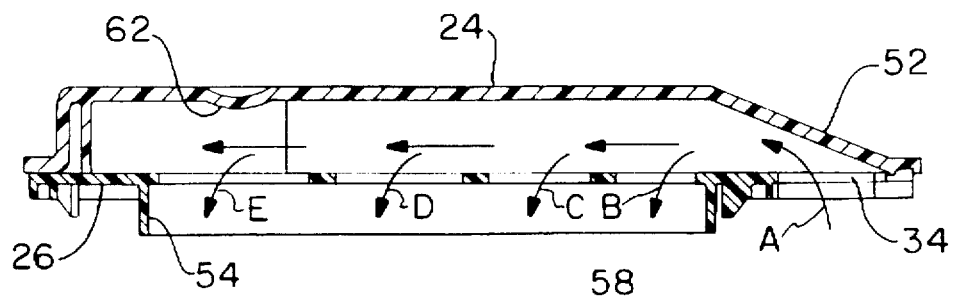
FIG. 4 is a cross-section of the air and liquid separator taken along line 4—4 in FIG. 3.

Referring now to FIGS. 2 and 4, the working air and entrained liquid enters the separating chamber 28 through the inlet opening 34, is deflected by an inclined portion 52 of the top plate 24 and flows horizontally through the separating chamber 28, as indicated by arrows A in FIGS. 2 and 4. As best seen in FIG. 2, the discharge openings 36, 38, 40 and 42 are arranged progressively along the stream A of air and liquid, such that the stream A of air and liquid exiting the inlet opening 34 flows sequentially over the discharge openings 36, 38, 40 and 42.

It is believed that as the stream A of air and entrained liquid passes over the first discharge opening 36, mostly just air (indicated by arrow B in FIG. 4) negotiates the tortuous downward turn through the first discharge opening, while, due to the greater inertial weight of the liquid relative the air, most of the liquid continues to flow with the remaining air horizontally over the remaining discharge openings 38, 40 and 42. It is believed drawing a portion of the air through the first discharge opening 36 and out of the stream A of air and liquid, causes the remaining stream of air and liquid in the separating chamber to expand and slow, enhancing separation of the liquid from the air remaining in the stream A. This process of expansion and slowing is sequentially repeated as the stream of liquid and air passes over each subsequent discharge opening 38, 40 and 42 (as illustrated by arrows C, D and E in FIG. 4), providing a great enhancement in separation of the liquid from the air in the separating chamber compared to a separator with a single discharge opening. Furthermore, providing a plurality of discharge openings in the bottom plate 26 disperses the flow of air and liquid entering the recovery tank 12 and helps decrease splashing, sloshing and foaming in the recovery tank.

As best seen in FIG. 2, a portion of the stream A passes completely over the discharge openings and is redirected by the dividing wall 32, such that this portion of stream A reverses direction and impinges upon a deflection surface 46 of a deflection wall 48 extending between the lid top plate 24 and bottom plate 26. The deflection surface 46 preferably lies in a plane (indicated by a dashed line 47) that intersects the third discharge opening 40, such that deflection surface 46 deflects the remainder of the stream A laterally across the separating chamber 28 generally toward the third discharge opening, as indicated by arrow F. The deflected stream F of air and entrained liquid collides with the stream A traveling over the discharge openings, causing the stream A to slow down thereby enhancing separation of soiled liquid from the working air.

In the preferred embodiment, the total cross-sectional area of the discharge openings 36, 38, 40 and 42 is preferably larger than the cross-sectional area of the suction duct 5 and the inlet opening 34, in order to slow the flow of air and entrained liquid and enhance separation of the liquid from the air. Furthermore, the discharge openings preferably increase in size moving downstream in the separating chamber, i.e. moving away from the inlet opening 34.

It is also preferred that the exit opening 50, the exhaust duct 51 and the outlet duct 53 all have cross-sectional areas that are greater than the cross-sectional area of the suction duct 5, so that they do not restrict the air flow through the separator. In the disclosed system, the suction duct 5 and the inlet opening preferably have a cross-sectional area of about one square inch. Furthermore, there are preferably four discharge openings in the lid bottom plate 26, preferably having diameters of 7/16", 1⅛", 1⅛" and 1½", respectively, moving sequentially downstream in the separating chamber 28. However, it will be appreciated that the exact number and size of the discharge openings and of the suction duct may vary without affecting the effectiveness of the lid as a separator. The number and sizes of the discharge openings required for effective separation is dependent on the size of the inlet chamber, size of the recovery tank, quantity of liquid entrained in the air, flow rate of liquid and air, arrangement and shape of the inlet chamber and recovery tank, and many other factors. The number and size of the discharge openings can be optimized for any given system.

Figure 3:
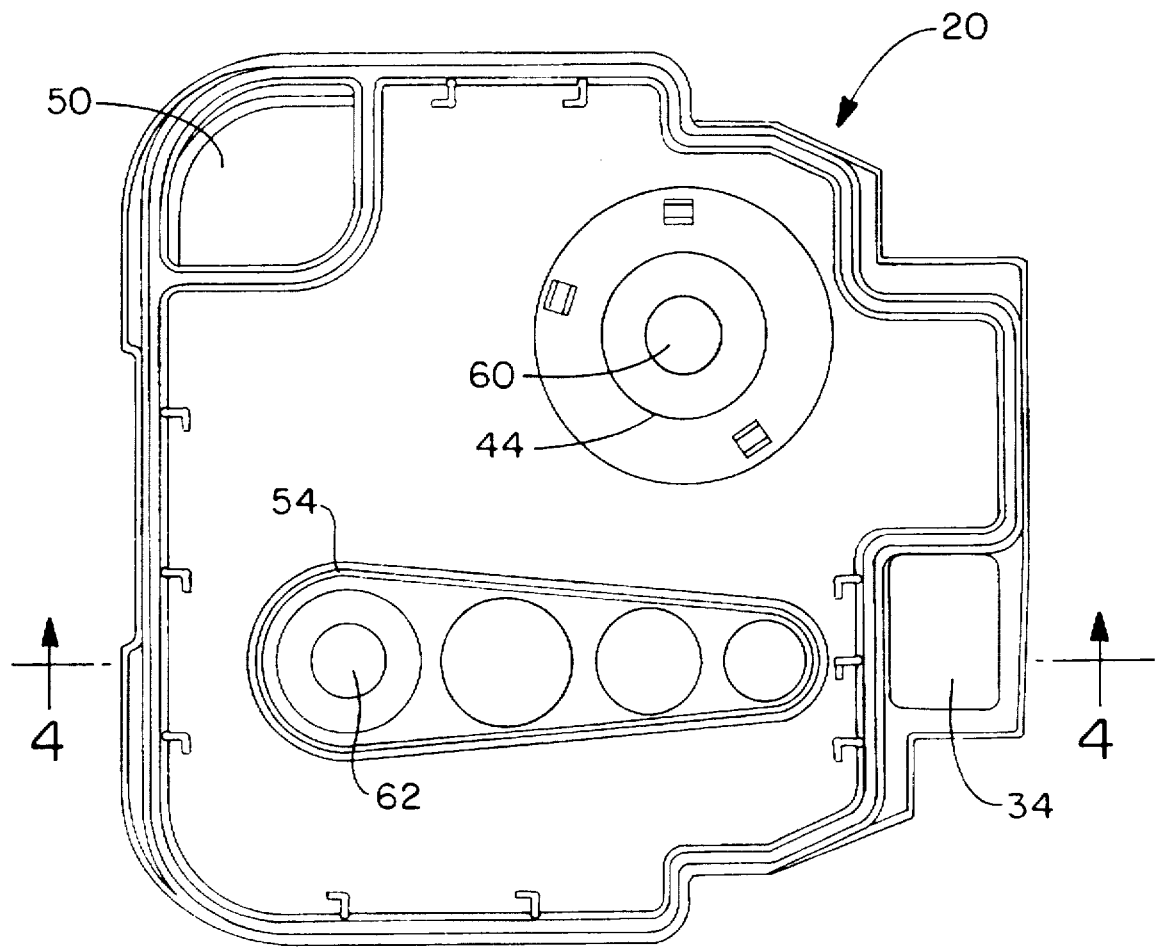
FIG. 3 is a bottom view of the recovery tank lid of FIG. 2 removed from the tank.

As best seen in FIGS. 3 and 4, a drip wall 54 preferably extends down from a lower surface of the bottom plate 26 and surrounds the discharge openings 36, 38, 40 and 42. The drip wall 54 prevents drops of liquid adhering to the lower surface of the bottom plate 26 from traveling across the bottom plate to the exit opening 44 and getting sucked into the motor fan assembly. Any drops adhering to the lower surface of the bottom plate will encounter the drip wall and drip off a lower edge 58 of the drip wall into the tank 12.

Small drip bumps or protrusions 60 and 62 (as shown in FIGS. 3 and 4) are preferably formed on the lower surface of the lid top plate 24 centrally over the exit opening 44 and the largest discharge opening 42. The drip bumps 60 and 62 provide drip points from which drops adhering to the lower surface of the top plate 24 may drip through the exit opening and largest discharge opening into the tank 12 when the suction fan is turned off.

Referring now to FIG. 5, positioned inside the recovery tank 12 is a plurality of vertical baffles, such as the illustrated baffles 64, 66 and 68. The baffles 64, 66, and 68 limit the degree of fluid sloshing during the forward and reverse push-pull operation of the extractor in the floor cleaning mode, inhibit splashing during operation of the extractor, and to assist in final separation of liquid from the working air. In addition to their function as anti-slosh baffles, the baffles also serve to prevent the establishment of a "short circuited" working air flow in the tank from the discharge openings directly to the exit opening 44. The baffles also disburse the incoming working air over that portion of the recovery tank's volume upstream of the baffles by forcing the working air to pass through openings between the baffles and between the baffles and the walls of the tank. Thus, the velocity of the air is slowed to a minimum value as it passes through the tank and the time that the working air spends within the tank is at a maximum, thereby providing for more complete liquid precipitation within the tank. The baffles 62, 64 and 66 are affixed to the floor of the recovery tank and extend upward therefrom.

The lid, or at least the lid top plate 24, is preferably formed of transparent material so that the operator may visually observe the flow of soiled liquid extracted from the surface being cleaned as the soiled liquid flows through the lid. Likewise, it is preferable to form the recovery tank 12 out of clear or translucent material so that the operator may visually observe the level of recovered liquid in the tank.

The foregoing description of a preferred embodiment illustrates and describes the plurality of discharge openings 36, 38, 40 and 42 as being arranged progressively along the flow of air and liquid in the separating chamber in a row, or straight line, that is substantially aligned with the inlet opening 34. However, it can be appreciated that the plurality of discharge openings could alternatively be disposed progressively along a curving flow of air and liquid. For example, the discharge openings may alternatively be disposed progressively along the curved portion of the dividing wall 32 in the above-described arrangement. Furthermore, the plurality of discharge openings may alternatively be arranged progressively along the stream of air and liquid in any suitable non-linear arrangement. For example, the discharge openings may be progressively located either centrally along the stream of air and liquid, toward the left side of the airstream, toward the right side of the airstream, or in any suitable combination thereof. It can also be appreciated that the plurality of discharge openings could alternatively decrease in size, rather than increase in size, moving downstream along the flow of air and liquid in the separating chamber.

In view of the above, the phrase "the plurality of discharge openings are arranged progressively along the stream of air and liquid" used to describe the arrangement of the plurality of discharge openings in the preceding description and in the appended claims, is not intended to limit the scope of the present invention to a separator having a plurality of discharge openings arranged linearly along the stream of air and liquid. The phrase "Progressively along the stream" is intended to describe a plurality of discharge openings that are arranged progressively downstream, i.e. progressively further and further away from the inlet opening, in either a linear or non-linear arrangement, or in any other desired pattern.

It can also be appreciated that a separator according to the present invention does not have to be formed in a removable lid of a recovery tank. The separator may alternately be incorporated either as an integral or as a removable part of the recovery tank, or either as an integral or as a removable part of the carpet extractor or other floor care appliance that is separate from the recovery tank. Furthermore, the exhaust or exit opening 44 may alternatively be provided in an exterior wall of the recovery tank 12, rather than being provided in the lid bottom plate.

Although the present invention has been described in connection with a preferred embodiment, many variations and modifications will become apparent to those skilled in the art upon reviewing the preceding description of a preferred embodiment and the attached drawings. It is intended, therefore, that the present invention be limited not by the specific disclosure herein, but only by the following claims.

Wherefore, I claim:

1. A combined air-liquid separator and liquid recovery tank for use with a carpet extractor, said combined air-liquid separator and liquid recovery tank comprising:

a liquid recovery tank;

a separator including a generally horizontal top plate located in an upper portion of the recovery tank, a generally horizontal bottom plate located in the upper portion of the recovery tank and spaced below the top plate, a peripheral wall extending between the top plate and the bottom plate enclosing a separating chamber in the space between the top and bottom plates;

the separator having an inlet opening to the separating chamber for receiving a stream of liquid laden air into the separating chamber and the bottom plate having a plurality of discharge openings passing therethrough communicating the separating chamber with the recovery tank, whereby liquid separated from the stream of liquid laden air traveling through the separating chamber drops through the discharge openings and is recovered in the recovery tank; and wherein the plurality of discharge openings are arranged progressively along the stream of liquid laden air traveling through the separating chamber.

2. A combined air-liquid separator and liquid recovery tank according to claim 1, wherein the discharge openings increase in size moving away from the inlet opening.

3. A combined air-liquid separator and liquid recovery tank according to claim 2, wherein there are four said discharge openings.

4. A combined air-liquid separator and liquid recovery tank according to claim 3, wherein the discharge openings have a total cross-sectional area that is greater than a cross-sectional area of the inlet opening.

5. A combined air-liquid separator and liquid recovery tank according to claim 1, wherein the bottom plate has the inlet opening passing therethrough adjacent the peripheral wall.

6. A combined air-liquid separator and liquid recovery tank according to claim 1, wherein the discharge openings are arranged in a row that is substantially aligned with the inlet opening, such that the stream of liquid laden air flows sequentially over the plurality of discharge openings.

7. A combined air-liquid separator and liquid recovery tank according to claim 1, further comprising a drip wall extending from a lower surface of the bottom plate and surrounding the plurality of discharge openings.

8. A combined air-liquid separator and liquid recovery tank according to claim 1, wherein the recovery tank has an exhaust opening operatively communicating the recovery tank with ambient atmosphere, whereby air entering the inlet opening passes through the separating chamber, through the recovery tank, through the exhaust opening and is exhausted to the ambient atmosphere.

9. A combined air-liquid separator and liquid recovery tank according to claim 1, further comprising a dividing wall extending between the top plate and the bottom plate dividing the space between the top plate, bottom plate and inside the peripheral wall into the separating chamber and an exit chamber; and wherein the bottom plate has an exit opening passing therethrough that communicates the recovery tank with the exit chamber and the exit chamber has an exhaust opening that communicates the exit chamber with ambient atmosphere.

10. A combined air-liquid separator and liquid recovery tank according to claim 9, wherein the recovery tank is an open top tank and the top plate and bottom plate define a hollow lid that is removably mounted to and seals the top of the tank.

11. A combined air-liquid separator and liquid recovery tank according to claim 1, wherein at least the top plate is formed of substantially transparent material so that an operator may visually observe the liquid flowing through the separating chamber.

12. A combined air-liquid separator and liquid recovery tank according to claim 1, wherein a portion of the peripheral wall opposite the inlet opening is concave toward the inlet opening and arranged such that the peripheral wall causes air and liquid passing completely over the plurality of discharge openings to substantially reverse direction and travel along one side of the separating chamber generally toward the inlet opening.

13. A combined air-liquid separator and liquid recovery tank according to claim 12, further comprising a deflection surface on the one side of the separating chamber for deflecting the air and liquid traveling along the one side of the separating chamber laterally across the separating chamber, such that the deflected air and liquid collides with the stream of air and liquid entering the separating chamber.

14. A combined air-liquid separator and liquid recovery tank according to claim 1, further comprising drip bump on a lower surface of the top plate located centrally over at least one of the discharge openings.

15. A combined air-liquid separator and liquid recovery tank according to claim 9, further comprising a drip bump on a lower surface of the top plate located centrally over one of the exit openings and at least one of the discharge openings.

16. A combined air-liquid separator and liquid recovery tank according to claim 15, wherein there are two said drip bumps, one drip bump is located centrally over the exit opening and the other drip bump is located over one of the discharge openings.

17. A combined air-liquid separator and liquid recovery tank according to claim 9, wherein the discharge openings increase in size moving away from the inlet opening.

18. A combination air-liquid separator and liquid recovery tank, for use in combination with a wet pickup suction cleaner having a wet pickup nozzle and a motor fan assembly for drawing a stream of air and liquid in through the nozzle, said combination separator and recovery tank comprising:

an open top recovery tank adapted to be removably mounted to such a wet pickup cleaner;

a hollow lid sealingly and removably mounted to the top of the tank, the hollow lid defining an inlet chamber therein, the inlet chamber having an inlet opening fluidly communicating the inlet chamber with the nozzle when the tank is mounted to the cleaner and the lid is mounted to the tank, and the inlet chamber having a plurality of discharge openings fluidly communicating the inlet chamber with the tank, whereby the motor fan assembly is in fluid communication with the nozzle and the inlet opening such that the motor fan assembly causes a stream of air and liquid to be drawn in through the nozzle and flow through the inlet opening into the inlet chamber where the liquid is separated from the air, drops through the discharge openings and is recovered in the recovery tank, and wherein the plurality of discharge openings are arranged progressively along the stream of air and liquid entering the inlet chamber.

19. A combination separator and recovery tank according to claim 18, wherein the plurality of discharge openings increase in size moving away from the inlet opening.

20. A combination separator and recovery tank according to claim 18, wherein there are four of said discharge openings.

21. A combination separator and recovery tank according to claim 20, wherein the discharge openings have a total cross-sectional area that is greater than a cross-sectional area of the inlet opening.

22. A combination separator and recovery tank according to claim 18, wherein the lid comprises a top plate and a bottom plate connected by a peripheral outer wall defining said inlet chamber between the top plate, the bottom plate and the peripheral wall, and the bottom plate having the plurality of discharge openings.

23. A combination separator and recovery tank according to claim 22, wherein a dividing wall extends between the top plate and bottom plate dividing the lid into the inlet chamber and an exit chamber.

24. A combination separator and recovery tank according to claim 23, wherein said bottom plate has an exit opening passing therethrough communicating the exit chamber with the recovery tank, and the exit chamber has an outlet opening communicating the exit chamber with an intake side of the motor fan assembly.

25. A combination separator and recovery tank according to claim 22, wherein said inlet opening is disposed substantially to one side of said inlet chamber.

26. A combination separator and recovery tank according to claim 24, wherein the plurality of discharge openings increase in size moving away from the inlet opening.

27. A combination separator and recovery tank according to claim 26, wherein there are four of said discharge openings.

28. A combination separator and recovery tank according to claim 27, wherein the discharge openings have a total cross-sectional area that is greater than a cross-sectional area of the inlet opening.

29. A combination liquid recovery tank and air-liquid separator for use in combination with a carpet extractor having a motor/fan assembly for creating a working airstream, the working airstream having entrained liquid when the carpet extractor is in use, the combination cleaning solution recovery tank and air-liquid separator comprising:

a tank;

a separating chamber located in an upper portion of the tank, the separating chamber having an inlet opening in fluid communication with the working airstream, whereby the working airstream flows through the inlet opening and through the separating chamber, and the separating chamber having a plurality of discharge openings providing fluid communication between the separating chamber and the tank;

wherein the plurality of discharge openings are arranged generally progressively away from the inlet opening.

30. A combination liquid recovery and air-liquid separator according to claim 29, wherein the plurality of discharge openings increase in size moving away from the inlet opening.

31. A combination liquid recovery and air-liquid separator according to claim 30, wherein there are four of said discharge openings.

32. A combination liquid recovery and air-liquid separator according to claim 31, wherein the four discharge openings have a total cross-sectional area that is greater than a cross-sectional area of the inlet opening.

33. A combination liquid recovery and air-liquid separator according to claim 29, filter comprising a drip wall surrounding the plurality of discharge openings and extending into the tank.

34. A combination liquid recovery and air-liquid separator according to claim 29, wherein the separating chamber is defined by a lid that is removably mounted to a top of the tank.

35. A combination liquid recovery and air-liquid separator according to claim 34, wherein the inlet opening is located to one side of the separating chamber.

36. A combination liquid recovery and air-liquid separator according to claim 34, wherein the lid is defined by a top plate and a bottom plate spaced beneath the top plate and the bottom plate has the inlet opening passing therethrough adjacent one side of the lid, whereby the working airstream enters the separating chamber vertically through the inlet opening, performs a sudden 90 degree change in direction and flows horizontally through the separating chamber.

37. A combination liquid recovery and air-liquid separator according to claim 36, wherein there are four of said discharge openings.

38. A combination liquid recovery and air-liquid separator according to claim 37, wherein the four discharge openings have a total cross-sectional area that is greater than a cross-sectional area of the inlet opening.

39. A combination liquid recovery and air-liquid separator according to claim 29, wherein a dividing wall extends between the top plate and the bottom plate and divides the space between the top plate and bottom plate into two chambers, one chamber being the separating chamber and the other chamber being an exit chamber; and the bottom plate has an outlet opening passing therethrough communicating the exit chamber with the tank, and the exit chamber has an exhaust opening that communicates the exit chamber with the external atmosphere, whereby air that has been separated from the liquid exits the tank via the outlet opening, exit chamber and exhaust opening and is exhausted to the atmosphere.

40. A combination liquid recovery tank and air-liquid separator according to claim 39, wherein the exhaust opening is in fluid communication with the motor/fan assembly, whereby the motor/fan assembly draws the working airstream in through the inlet chamber and through the tank, such that the liquid is separated from the air and recovered in the tank, and the air in the tank is drawn by the motor/fan assembly out through the exit chamber and exhausted to the atmosphere.

41. A combination liquid recovery and air-liquid separator according to claim 39, further comprising a drip wall extending from the bottom plate into the tank and surrounding the discharge openings.

42. An air and water separator for use with a wet pickup floor care appliance, said separator comprising:

a generally horizontal upper wall and a generally horizontal lower wall interconnected by a peripheral wall extending between the upper and lower walls defining a separating chamber, the separating chamber having an inlet opening for receiving a stream of air and water into and through the separating chamber; and the lower wall having a plurality of discharge openings passing therethrough, the plurality of discharge openings being arranged generally progressively further away from the inlet opening, whereby the stream of air and liquid flows generally sequentially over the plurality of discharge openings with air and water being generally sequentially drawn through each of the discharge openings causing the remaining air and water in the separating chamber to expand and slow causing the water to separate from the air and drop through the discharge openings.

43. A separator according to claim 42, wherein the discharge opening increase in size moving away from the inlet opening.

44. A separator according to claim 43, wherein there are four of said discharge openings.

45. A separator according to claim 42, further comprising a drip wall extending from the bottom plate and surrounding the discharge openings.

* * * * *